United States Patent
Kim

(10) Patent No.: US 6,845,461 B1
(45) Date of Patent: Jan. 18, 2005

(54) HIGH-SPEED BUS WITH EMBEDDED CLOCK SIGNALS

(75) Inventor: Ook Kim, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 465 days.

(21) Appl. No.: 09/989,590

(22) Filed: Nov. 20, 2001

(51) Int. Cl.[7] ............................................... G06F 13/14
(52) U.S. Cl. ........................ 713/500; 710/316; 710/305
(58) Field of Search .................... 713/500; 710/305, 710/316

(56) References Cited

U.S. PATENT DOCUMENTS

| | | | | |
|---|---|---|---|---|
| 5,018,110 A | * | 5/1991 | Sugiyama et al. | 365/230.09 |
| 5,025,419 A | * | 6/1991 | Nishino | 365/221 |
| 5,376,928 A | * | 12/1994 | Testin | 340/825.5 |
| 6,058,442 A | * | 5/2000 | Fort | 710/100 |
| 6,480,921 B1 | * | 11/2002 | Mansoorian et al. | 710/305 |

* cited by examiner

*Primary Examiner*—A. Elamin
(74) *Attorney, Agent, or Firm*—Perkins Coie LLP

(57) ABSTRACT

A system and method for embedding at least one clock signal into bus lines that also carry data signals at other times to enable a high-speed bus is disclosed. Each bus line is used for carrying both clock and data information at different times. Data signals, which may be either encoded or not, are carried through a subset of the bus lines through a mapping scheme that maps the data information to the bus lines at each data transfer while the clock signals are carried in the remaining bus lines. Various mapping schemes are possible.

30 Claims, 4 Drawing Sheets

| Bus Lines | Time → | | | | | | | | | | | | | | | |
|---|---|---|---|---|---|---|---|---|---|---|---|---|---|---|---|---|
| B0 | 0 | 1 | D0 | D0 | D0 | D0 | D0 | D0 | D0 | 0 | 1 | D0 | D0 | D0 | D0 | D0 |
| B1 | D0 | 0 | 1 | D0 | D1 | D1 | D1 | D1 | D1 | D0 | 0 | 1 | D1 | D1 | D1 | D1 |
| B2 | D1 | D0 | 0 | 1 | D1 | D2 | D2 | D2 | D2 | D1 | D1 | 0 | 1 | D2 | D2 | D2 |
| B3 | D2 | D1 | D1 | 0 | 1 | D2 | D3 | D3 | D3 | D2 | D2 | D2 | 0 | 1 | D3 | D3 |
| B4 | D3 | D2 | D2 | D2 | 0 | 1 | D3 | D4 | D4 | D3 | D3 | D3 | D3 | 0 | 1 | D4 |
| B5 | D4 | D3 | D3 | D3 | D3 | 0 | 1 | D4 | D5 | D4 | D4 | D4 | D4 | D4 | 0 | 1 |
| B6 | D5 | D4 | D4 | D4 | D4 | D4 | 0 | 1 | D6 | D5 | D5 | D5 | D5 | D5 | D5 | 0 |
| B7 | D6 | D5 | D5 | D5 | D5 | D5 | D5 | 0 | 1 | D6 | D6 | D6 | D6 | D6 | D6 | D6 |
| B8 | D7 | D6 | D6 | D6 | D6 | D6 | D6 | D6 | 0 | D7 | D7 | D7 | D7 | D7 | D7 | D7 |
| B9 | 1 | D7 | D7 | D7 | D7 | D7 | D7 | D7 | 1 | 1 | 1 | 1 | 1 | 1 | 1 | 1 |

| Bus Lines | | | | | | | | | | | | | | | Time → | | |
|---|---|---|---|---|---|---|---|---|---|---|---|---|---|---|---|---|---|
| B0 | C  | CB | D0 | D0 | D0 | D0 | D0 | D0 | D0 | D0 | D0 | D0 | D0 | CB | C  | D0 | D0 |
| B1 | D0 | C  | D0 | D1 | D1 | D1 | D1 | D1 | D1 | D1 | D1 | D1 | CB | C  | D0 | D1 | D1 |
| B2 | D1 | D0 | CB | CB | D2 | D2 | D2 | D2 | D2 | D2 | D2 | CB | C  | D0 | D1 | D2 | D2 |
| B3 | D2 | D1 | C  | C  | CB | D3 | D3 | D3 | D3 | D3 | CB | C  | D1 | D1 | D2 | CB | D3 |
| B4 | D3 | D2 | D2 | D2 | C  | CB | D4 | D4 | D4 | CB | C  | D2 | D2 | D2 | D3 | C  | CB |
| B5 | D4 | D3 | D3 | D3 | D3 | C  | CB | D5 | CB | C  | D3 | D3 | D3 | D3 | D4 | D3 | C  |
| B6 | D5 | D4 | D4 | D4 | D4 | D4 | C  | CB | C  | D4 | D4 | D4 | D4 | D4 | D5 | D4 | D4 |
| B7 | D6 | D5 | D5 | D5 | D5 | D5 | D5 | C  | D5 | D5 | D5 | D5 | D5 | D5 | D6 | D5 | D5 |
| B8 | D7 | D6 | D6 | D6 | D6 | D6 | D6 | D6 | D6 | D6 | D6 | D6 | D6 | D6 | D7 | D6 | D6 |
| B9 | CB | D7 | D7 | D7 | D7 | D7 | D7 | D7 | D7 | D7 | D7 | D7 | D7 | D7 | CB | D7 | D7 |

Fig. 3

| Bus Lines | Time → | | | | | | | | | | | | | | | | | | | | |
|---|---|---|---|---|---|---|---|---|---|---|---|---|---|---|---|---|---|---|---|---|---|
| 0 | 0 | 1 | A | A | A | A | A | A | A | A | A | A | A | A | A | A | A | A | A | A | A |
| 1 | A | A | 0 | 1 | B | B | B | B | B | B | B | B | B | B | B | B | B | B | B | B | B |
| 2 | B | B | B | A | 0 | 1 | C | C | C | C | C | C | C | C | C | C | C | C | C | C | C |
| 3 | C | C | C | C | C | C | B | 0 | 1 | D | D | D | D | D | D | D | D | D | D | D | D |
| 4 | D | D | D | D | D | D | D | D | C | 0 | 1 | E | E | E | E | E | E | E | E | D | D |
| 5 | E | E | E | E | E | E | E | E | E | E | D | 0 | 1 | F | F | F | F | F | E | E | E |
| 6 | F | F | F | F | F | F | F | F | F | F | F | F | E | 0 | 1 | G | G | F | F | F | F |
| 7 | G | G | G | G | G | G | G | G | G | G | G | G | G | G | F | 1 | 0 | G | G | G | G |
| 8 | H | H | H | H | H | H | H | H | H | H | H | H | H | H | H | G | H | 1 | 0 | H | H |
| 9 | — | — | — | — | — | — | — | — | — | — | — | — | — | — | — | — | — | — | 1 | 0 | 1 |

*Fig. 4*

HIGH-SPEED BUS WITH EMBEDDED CLOCK SIGNALS

BACKGROUND

1. Technical Field

Embodiments of the invention relate to systems and methods for transmitting digital data.

2. Description of the Background

Digital devices in general, and computers in particular, have used buses in one form or another to exchange digital data. In some instances the bus has allowed diverse digital devices such as central processing units ("CPUs"), main memory cards, hard disks, input/output devices and other digital devices to share data through the use of a common bus. Today the bus is widely used as a convenient means of carrying digital data information through a set of parallel conductors, or other devices permitting digital communications such as optical fibers. In order for different digital devices to utilize the same bus, standards for the transmission and reception of digital data on that bus are often defined. These standards often include the use of an associated clock in order to prevent data collision and increase the overall throughput of the bus. For example, standards define the exchange of data for RAMBUS and synchronous dynamic random access memory ("SDRAM") that enable the synchronous data transfer through a bus with the use of a clock. Such clocked buses sometimes have a separate clock line to allow a phase-locked loop ("PLL") or a delay-locked loop ("DLL") to sync up data transmission/reception circuitry with the actual data being exchanged. As such digital devices utilizing buses continue to increase in the speeds they operate at and communicate with, the buses have had to keep pace. This continued increase in bus throughput has put increasing importance on the accuracy of clock signals used to control such buses. Clock signals are generated and distributed to the devices connected to a given bus, but previously minor temporal differences ("skew") between individual clock signals and each bit of data being carried on a bus can now significantly affect the overall performance of the bus at high-speeds.

Skew between clock signals and data signals can occur for many reasons. For example, the conductive lines used in many computer buses can suffer from different time delays and different transmission characteristics between such lines due to line mismatch, parasitic mismatch, device mismatch, impedance mismatch, etc. Often times individual data bits and clock bits have dedicated lines that display such differences in transmitting digital signals. Unfortunately, these differences become exacerbated as the underlying speed of the bus is increased and such differences in the time delays can create a limitation on the maximum bandwidth attainable for a high-speed bus.

Therefore, it would be desirable to provide a high-speed bus that overcomes or mitigates the problems described herein.

BRIEF DESCRIPTION OF THE DRAWINGS

Embodiments of the invention can be readily understood by considering the following detailed description in conjunction with the accompanying drawings. The drawings are not necessarily drawn to scale.

FIG. 2 is a diagram of a mapping scheme according to one embodiment the invention.

FIG. 3 is a diagram of a mapping scheme according to another embodiment the invention.

FIG. 4 is a diagram of a mapping scheme according to yet another embodiment the invention.

Figure 1:
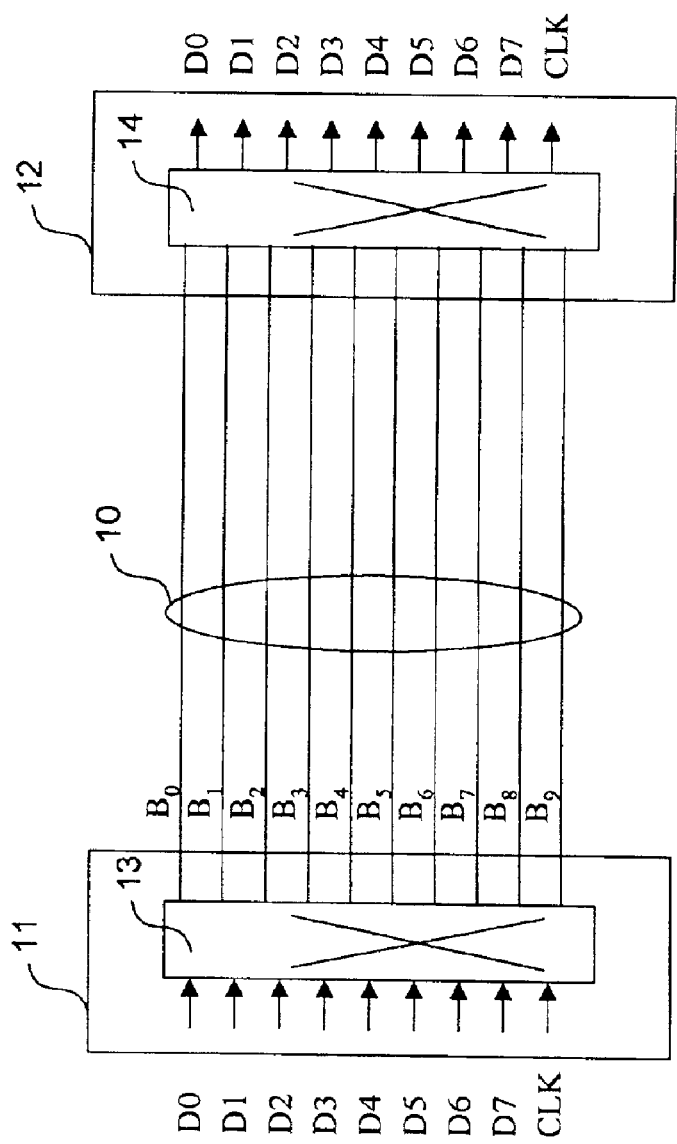
FIG. 1 is a block diagram of a high-speed bus having embedded clock signals according to the invention.

The headings provided herein are for convenience only and do not necessarily affect the scope or meaning of the claimed invention.

DETAILED DESCRIPTION OF THE EMBODIMENTS

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention. For each embodiment, the same reference numbers and acronyms identify elements or acts with the same or similar functionality for ease of understanding and convenience.

The problems and disadvantages described above are mitigated or overcome by embodiments of the invention which provide a high-speed bus having clock signals embedded within the data on common bus lines. The clock signals are transmitted on the same lines as the data signals, but at different times. Stated another way, each bus line carries both data and clock information at different cycle times. In any give clock cycle, data signals are carried through a subset of the bus lines through a mapping scheme that maps the data and clock signals to different bus lines. Corresponding mapping units at a transmitting device and a receiving device provide the clock and data mapping patterns onto the bus as described herein. Several alternative embodiments of the clock and data mapping scheme are described.

Turning to FIG. 1, a block diagram of one embodiment of the invention describes a system and method for providing a high-speed bus having embedded clock signals. For illustration purposes, FIG. 1 shows a 10-bit bus 10, which in some clock cycles includes eight data bits and a clock bit with one unused bus line that can be eliminated in this embodiment. Note that the bus 10 may have any number of bits, for example, in some of the embodiments described herein the bus 10 has ten bits that are all used. The bus 10 is connected between a transmitter digital device 11 having a first mapping unit 13 and a receiver digital device 12 having a second mapping unit 14, the first mapping unit 13 corresponding to the second mapping unit 14. Note the mapping units referred to herein may be implemented in a variety of ways including by a cross-bar switch or a multiplexer. The first mapping unit is connected to an input bus having nine lines D0–D7 and CLK. The second mapping unit is connected to an output bus having nine lines D0–D7 and CLK, corresponding to the input bus. The first mapping unit 13 receives data signals and a clock signal from the input bus and maps them, as described below, onto the nine lines of the bus 10 during each clock cycle. The second mapping unit 14 receives the data and clock signals and likewise maps them onto the output bus. In operation, a pattern of eight data bits and a clock bit are received from the input bus by the first mapping unit 13 and mapped in a pattern according to a mapping scheme onto the bus 10 in a manner described herein. The second mapping unit 14 receives the data and clock bits from the bus 10 and under the mapping scheme, demaps those bits onto the output bus, such that the original pattern of data and clock bits is restored. The bits on the input bus and output bus travel on dedicated bus lines, but the bits that travel on the bus 10 are not fixed rigidly fixed to a single line in every cycle.

Mapping Scheme #1

Turning to FIG. 2, a diagram shows one embodiment of a mapping scheme according to the invention. In this embodiment the bus 10 has ten lines B0–B9 (as shown in FIG. 1). The eight data bits designated D0–D7 and two clock bits designated logical 0 and logical 1 are mapped by the first mapping unit 13 onto the ten bits of the bus 10 in each clock cycle according to the scheme shown. Each column illustrates a data pattern transmitted through bus lines (B0–B9) 21 at each time instant of data transfer, e.g., each clock cycle. Data bits D0–D7, 22, are the specific bit locations of an 8-bit data word transmitted through the bus 10. Each row represents the value of data or the clock bits embedded in the data carried through each bus line along the time axis.

Unlike a more conventional bus where each bus line carries data bits in a particular bit location within a data word, the data bit within a particular data word is not transmitted on a prefixed bus line at each time instant, but in one embodiment, on all the bus 10 line at different times. Each data bit is assigned to a particular bus line at each time instant through the mapping scheme. Referring again to FIG. 2, during the first time period (the left most time period) on bus line B0 we see that an initial clock cycle begins at logical zero, while the eight lines B1–B8 carry data bits D0–D7, respectively. Bus line B9 carries a logical one corresponding to another clock signal. In this embodiment the clock signals are overlapped. In the next time period, B0 transitions from a logical zero to a logical one, providing a positive clock edge for the receiver digital device which may contain a PLL or a DLL. In this time period, B1 carries a logical zero, corresponding to the next clock cycle and bus lines B2–B9 carry data bits D0–D7, respectively. This pattern continues as shown in FIG. 2 with overlapped clock cycles marching through all the available bus lines B0–B9 21. Note that in this embodiment, two bus lines 21 are consumed by clock bits in any given time period.

Since only the identity of the bus lines carrying data bits needs to be changed at each time instant without changing the value of the data bits, there is no need for encoding the data bits to be transmitted. In other words, data bits are transmitted and received at different bus lines at each time instant. This can be easily implemented by using a crossbar switch or a multiplexer at the transmitter side 11 and at the receiver side 12. Not only is the necessary hardware compact, but the associated delays are reduced.

Initial synchronization at the receiver side 11 can be done in various ways. If there is no data transmitted, there is no toggling of bits. The receiver 11 can be designed to watch for the first transition of the B0 line, which signals the first data transmission event.

By embedding the clock bits among the data bits on the bus 10, and skew that is unique to the data bits is minimize because the clock essentially uses the exact same lines at the data bits over time. This minimizes the effects of different time delays and different transmission characteristics between such lines due to line mismatch, parasitic mismatch, device mismatch, impedance mismatch, etc.

Mapping Scheme #2

Turning to FIG. 3, a diagram shows another embodiment of a mapping scheme according to the invention. In this embodiment the bus 10 has ten lines B0–B9. The eight data bits designated D0–D7 and two clock bits designated clock ("C") and clock bar ("CB") are mapped by the first mapping unit 13 onto the ten bits of the bus 10 in each clock cycle according to the scheme shown. C and CB are logical opposites, i.e., either 0 and 1, or 1 and 0, respectively. Each column illustrates a data pattern transmitted through bus lines (B0–B9) 21 at each time instant of data transfer, e.g., each clock cycle. Data bits D0–D7, 22, are the specific bit locations of an 8-bit data word transmitted through the bus 10. Analogous to Mapping Scheme #1, there are two lines consumed by the clock in any given time period, however, in this case the clock may be transitioning from a logical one state to a logical zero state, thus providing a negative-edge instead of a positive-edge. D0 through D7 may be encoded data or original data. C and CB can be dependent on the data pattern. The clock provides either a 0-to-1 (positive-edge) or a 1-to-0 (negative-edge) transition. In some cases it is useful to have the flexibility to provide either a negative-edge or a positive-edge depending on the characteristics of the bus 10 and/or characteristics of circuitry in the transmitter 11 and the receiver 12.

Mapping Scheme #3

Turning to FIG. 4, a diagram shows yet another embodiment of a mapping scheme according to the invention. In this embodiment the bus 10 has ten lines 0–9. Note that different labeling is used in FIG. 4 because of space and clarity considerations. Nine data bits are designated A–I, respectively, and a single clock bit either in a logical zero or a logical one state are mapped by the first mapping unit 13 onto the ten bits of the bus 10 in each clock cycle according to the scheme shown. Each column illustrates a data pattern transmitted through bus lines (B0–B9) 21 at each time instant of data transfer, e.g., each clock cycle. Data bits A–I, are the specific bit locations of a 9-bit data word transmitted through the bus 10. Unlike Mapping Scheme #1 or Mapping Scheme #2, there is only one line consumed by the clock in any given time period. In one embodiment the clock may be transitioning from a logical one state to a logical zero state, thus providing a negative-edge instead of a positive-edge. D0 through D7 may be encoded data or original data.

Since one clock transition takes two time periods on the bus, clock transitions occur every other bus cycle. Compared to the previous embodiments, one bus line is saved, which allows the bus lines to carry 9-bit code words for a more rigorous code in terms of resisting electromagnetic interference ("EMI") and direct current ("DC") balancing.

Thus there has been described a system and method for producing a high-speed bus with embedded clock signals. There are numerous benefits for using an embedded clock as described herein. For example, by embedding clock signals into bus lines that also carry data signals at different times, embodiments of the present invention eliminate the adverse effects of carrying clock information through a separate wire.

Although some embodiments were shown as having clock transitions for every clock cycle, it would be apparent to a person skilled in the art would that this invention can be extended to have those clock transitions for every n cycles. The invention can be extended to a (9+n) bit code space. The transition edge can be balanced, making the number of positive-edge and negative-edge transitions either equal or closer to being equal.

Although some embodiments are shown using 8 original data bits, those skilled in the art would appreciate that it can be readily extend to an arbitrary number of bits for the original data, and to a bus having an arbitrary number of bus lines.

Embodiments of the invention may be employed in not only systems, but also in subsystems and chips. Complicated semiconductor chips having multiple subsystems operating under several different clocks may often be required to transmit data across-such chip subsystems. Embodiments of the invention permit data to be accurately extracted from transmitted waveforms, thereby reducing bit error rates in such chips.

Incorporated by reference herein are all above references, patents, or applications and the following U.S. applications, which are assigned to the assignee of this application: Application No. 10/371,220, entitled "DATA SYNCHRONIZATION ACROSS AN ASYNCHRONOUS BOUNDARY USING, FOR EXAMPLE, MULTI-PHASE CLOCKS"; Application No. 09/989,580, entitled "BIDIRECTIONAL BRIDGE CIRCUIT HAVING HIGH COMMON MODE REJECTION AND HIGH INPUT SENSITIVITY"; Application No. 09/989,587, entitled "MULTI-PHASE VOLTAGE CONTROL OSCILLATOR (VCO) WITH COMMON MODE CONTROL", Application No. 09/989,645, entitled "SYSTEM AND METHOD FOR MULTIPLE-PHASE CLOCK GENERATION", and Application No. 10/043,886, entitled "CLOCK AND DATA RECOVERY METHOD AND APPARATUS". Aspects of the invention can be modified, if necessary, to employ the systems, functions and concepts of the various patents and applications described above to provide yet further embodiments of the invention.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while bits are presented in a given order, alternative embodiments may present bits in a different order. The teachings of the invention provided herein can be applied to other systems, not necessarily the system described herein. These and other changes can be made to the invention in light of the detailed description. The elements and acts of the various embodiments described above can be combined to provide further embodiments.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a semiconductor chip, other aspects may likewise be embodied in a chip. Accordingly, the inventors reserve the right to add additional claims after filing the application to pursue such additional claim forms for other aspects of the invention.

I claim:

1. A method for providing a bus, the bus having associated time periods for transferring a number D data bits during each time period, comprising:

receiving the D data bits and a clock bit;

mapping the D data bits and the clock bit onto a number B bus lines to produce mapped data bits and one mapped clock bit, the number B being equal to D plus at least one, wherein the clock bit is mapped onto at least one bus line, the at least one bus line also being used by at least one data bit at a different time period; and transmitting the mapped data bits and one mapped clock bit on the bus.

2. The method of claim 1, wherein D equals nine.

3. The method of claim 1, wherein D equals eight.

4. The method of claim 1, wherein D is less than eight.

5. The method of claim 1, wherein D is greater than nine.

6. The method of claim 1, wherein the data bits are encoded before the step of mapping.

7. The method of claim 1 wherein the one mapped clock bit produces positive-edge signals.

8. The method of claim 1 wherein the one mapped clock bit produces negative-edge signals.

9. A method for providing information on a bus, the bus having associated time periods for transferring a number D data bits during each time period, comprising:

receiving the D data bits and at least one clock bit;

mapping the D data bits and the clock bit onto a number B bus lines to produce mapped data bits and a mapped clock bit set, the number B being less than or equal to D plus one, wherein the mapped clock bit set is mapped onto a corresponding number of different bus lines at some different time periods; and transmitting the mapped data bits and the mapped clock bit set on the bus.

10. The method of claim 9, wherein the mapped clock bit set is mapped to a single bus line.

11. The method of claim 9, wherein the mapped clock bit set is mapped to a plurality of bus lines.

12. The method of claim 9, wherein D equals nine.

13. The method of claim 9, wherein D equals eight.

14. The method of claim 9, wherein D is less than eight.

15. The method of claim 9, wherein D is greater than nine.

16. The method of claim 9, wherein the data bits are encoded before the step of mapping.

17. The method of claim 9 wherein the one mapped clock bit produces positive-edge signals.

18. The method of claim 9 wherein the one mapped clock bit produces negative edge signals.

19. A method for providing a parallel bus, the parallel bus having associated time periods for transferring a number D data bits during each time period, comprising:

receiving the data bits and at least one clock bit;

mapping the data bits and clock bit onto a number of parallel bus lines, wherein the data bits and clock bit are not mapped to the number of parallel bus lines identically in at least some successive time periods.

20. A method for providing a parallel bus, the parallel bus having associated time periods for transferring a number D data bits during each time period, comprising:

receiving the data bits and at least one clock bit from the parallel bus;

demapping the data bits and the at least one clock bit, wherein data bits and the at least one clock bit are not demapped identically in at least some successive time periods.

21. An integrated circuit, comprising:

a parallel bus, the parallel bus having associated time periods for transferring a number D data bits during each time period;

a multiplexer having inputs capable of receiving D data bits and a clock bit, the multiplexer mapping the data bits and clock bit onto a corresponding number of different parallel bus lines at some different time periods.

22. A computing device, comprising:

a parallel bus, the parallel bus having associated time periods for transferring a number D data bits during each time period;

a multiplexer having inputs capable of receiving the D data bits and a clock bit, the multiplexer mapping the data bits and clock bit onto a corresponding number of different parallel bus lines at some different time periods.

23. A method for providing a bus, the bus having associated time periods for transferring a number D data bits during each time period, comprising:

receiving the D data bits and a clock bit;

mapping the D data bits and the clock bit onto a number B bus lines to produce mapped data bits and at least one mapped clock bit, the number B being equal to D plus at least one, wherein the at least one clock bit is mapped onto at least one bus line such that the at least one clock bit is mapped over multiple time periods onto the bus lines in a cyclic manner; and transmitting the mapped data bits and one mapped clock bit on the bus.

24. The method of claim 23, wherein D equals nine.

25. The method of claim 23, wherein D equals eight.

26. The method of claim 23, wherein D is less than eight.

27. The method of claim 23, wherein D is greater than nine.

28. The method of claim 23, wherein the data bits are encoded before the step of mapping.

29. The method of claim 23 wherein the one mapped clock bit produces positive-edge signals.

30. The method of claim 23 wherein the one mapped clock bit produces negative-edge signals.

* * * * *